April 5, 1932.  J. F. NAFFZIGER  1,852,361
GRAIN CLEANER
Filed Sept. 21, 1928    3 Sheets-Sheet 1
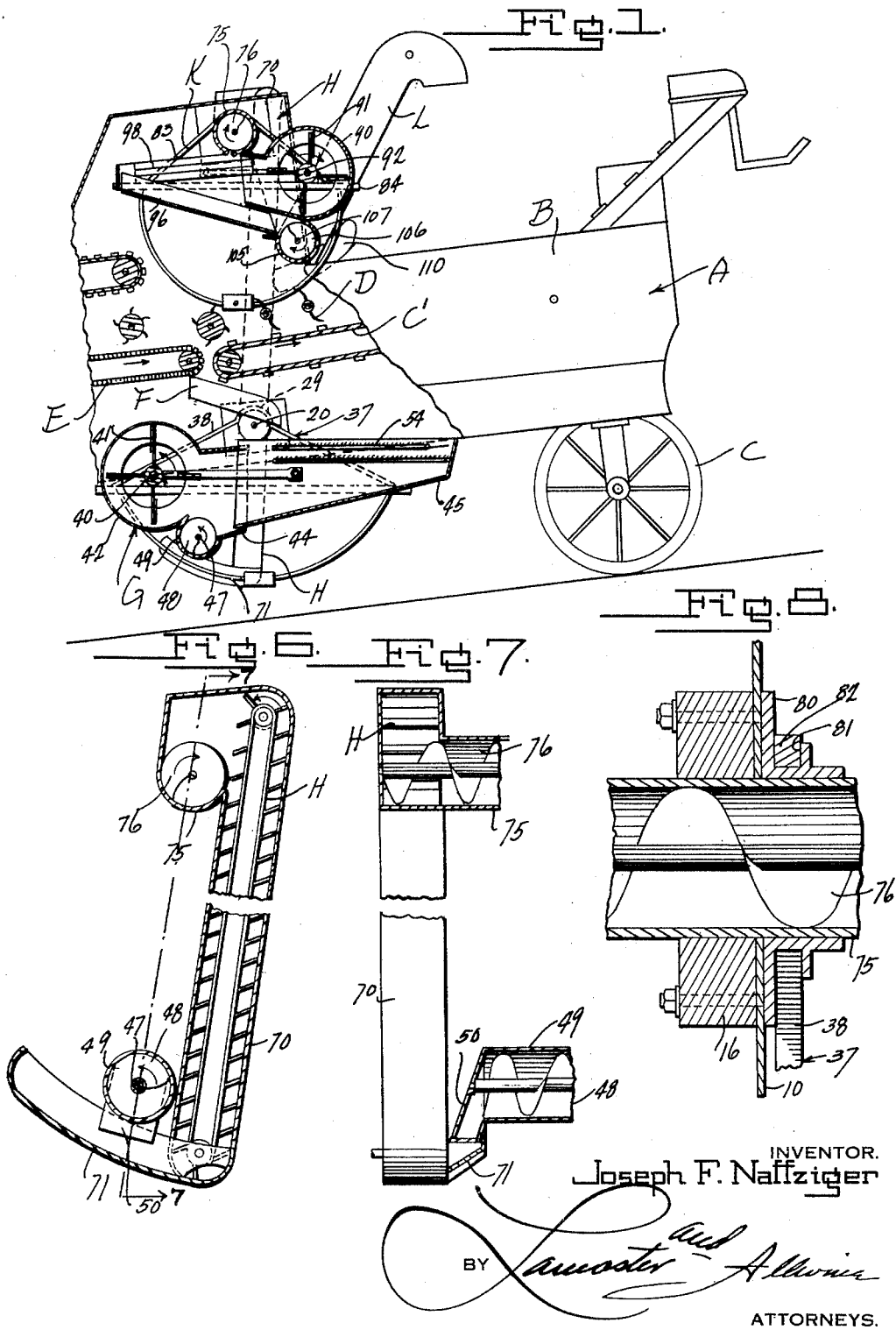
INVENTOR.
Joseph F. Naffziger
BY
ATTORNEYS.

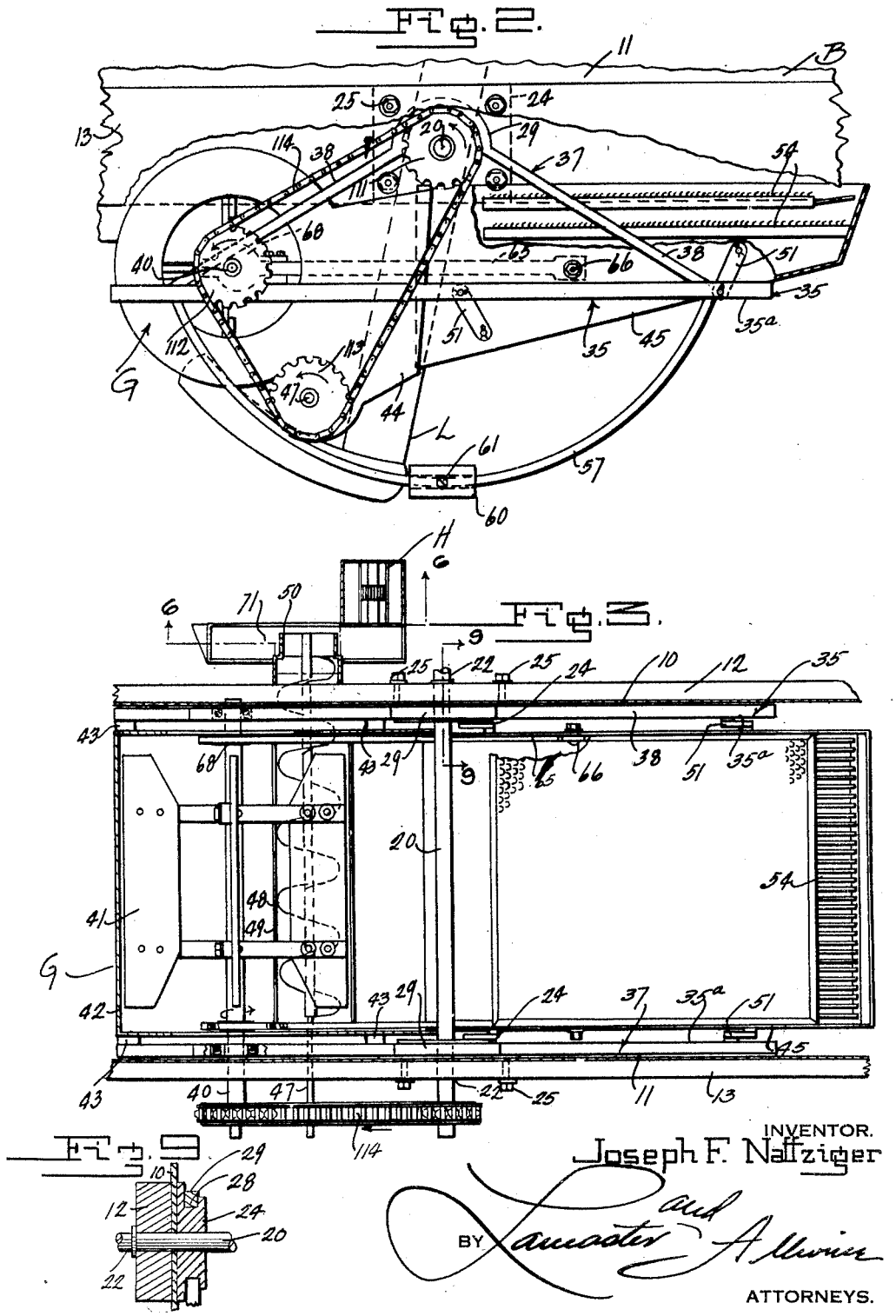

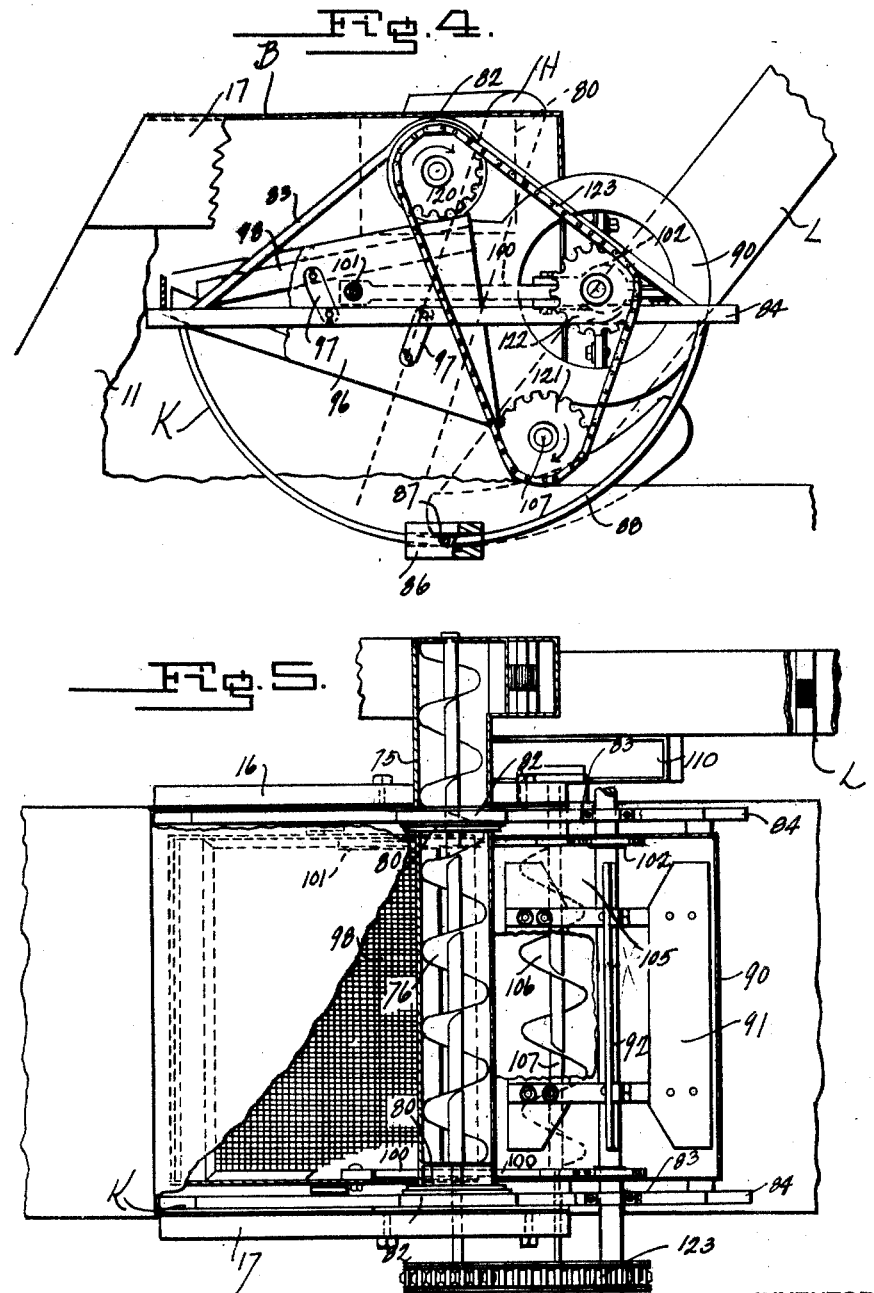

Patented Apr. 5, 1932

1,852,361

UNITED STATES PATENT OFFICE

JOSEPH F. NAFFZIGER, OF PULLMAN, WASHINGTON

GRAIN CLEANER

Application filed September 21, 1928. Serial No. 307,396.

This invention relates to improvements in combination harvesting and threshing machines.

The primary object of this invention is the provision of an improved leveling device for use upon harvesting-threshing machines, by means of which the separators and cleaners may be maintained in a desired automatically regulated plane, so as to permit the wind blast to fall on the screens and the grain at the same angular relation, at all times, regardless of the travel of the machine over hilly or level country.

A further object of this invention is the provision of an improved harvesting-threshing machine, having a novel synchronized gravity operated grain cleaner and recleaner mechanism cooperably related with respect to an elevator, so as to permit their efficient cooperation in the cleaning of grain with a maximum yield.

Other objects and advantages of this invention will be apparent during the course of the following detailed description.

In the accompanying drawings, forming a part of this specification, and wherein similar reference characters designate corresponding parts throughout the several views, Figure 1 is a fragmentary side elevation of the improved harvesting-threshing machine, showing the self leveling separating and cleaning units.

Figure 2 is a fragmentary side elevation, partly in section, showing the improved grain separator or cleaner in its novel gravity leveled relationship of parts.

Figure 3 is a plan view of the details shown in Figure 2.

Figure 4 is a fragmentary view, partly in section, showing the gravity leveling recleaner unit and its assemblage upon the machine.

Figure 5 is a plan view of details shown in Figure 4.

Figure 6 is a sectional view taken substantially on the line 6—6 of Figure 3.

Figure 7 is a sectional view taken substantially on the line 7—7 of Figure 6.

Figure 8 is a fragmentary sectional view taken through a bearing constituting a pivotal support on the side wall of the thresher housing, for the self leveling separating unit.

Figure 9 is a fragmentary cross section of a bearing of the improved device.

In the drawings, wherein for the purpose of illustration is shown only a preferred embodiment of the invention, the letter A may generally designate the improved combination harvesting and threshing machine, which may consist of a housing B supported upon running gear C of conventional character. So far as the threshing part of the machine A is concerned it may include a carrier C, which may receive the grain after passing through the concaves and cylinder, and which carries the grain past rotors D towards a straw carrier E. The kernels and chaff, as well as some other foreign material, fall upon a chute or trough F and carry the kernels for a cleaning operation upon a novel separator unit G, to be subsequently described. The grain after cleaning on the separator G is conducted by an elevator H, to the upper part of the threshing machine where the grain is treated in a recleaner unit K, possessing many of the characteristics of the unit G. The grain from the recleaner K, is conducted by a conveyor L to the sacking mechanism.

Referring more particularly to Figures 1, 2 and 3 of the drawings, the housing B preferably includes sheet metal side walls 10 and 11, which are supported upon chassis beams 12 and 13 respectively. The housing may also include top horizontal beams 16 and 17 for the side walls 10 and 11 respectively, which aid in the support of the recleaner K to be subsequently described.

Referring more particularly to the separator unit G, it may be mentioned that the same is mounted so as to assume an intended level position, by gravity, independent of the inclination of the machine on the ground, in order to have an efficient blast action of air upon the grain and chaff in a particular traveling position. To this end, a shaft 20 is rotatably supported at its ends 22 in the beams 12 and 13 forming the chassis of the harvesting-threshing machine, and this shaft 20 at the insides of each of the walls 10 and 11 receives thereon bearings 24, more particularly detailed in Figure 9 of the drawings, and forming supports for the swinging frame of the separator unit G. These bearings 24 are bolted at 25 to the beams 12 and 13, and to the side walls of the machine housing, in order to position them stationary. They are each provided with annular grooves 28 thereabout, wherein the segmental shaped portions 29 of the side supports of the separator unit are oscillatively received, as shown in various views of the drawings. The shaft 20 may be the main drive shaft, rotated in any approved manner, and it is not keyed with the bearings 24; the latter being stationary.

Referring to details of the separator unit G, the same includes a main frame 35, consisting of side rails which may be suitably connected at their ends if desired. These side rails have inverted V-shaped supports 37, each of which include the upwardly convergent legs 38 joining at the segmental portion 29 which pivotally bears on the bearings 24 above described. Thus, the supports 37 carry the beams forming the frame 35 at the insides of each of the side walls of the machine.

At the front end of the frame 35, supported on the side beams which comprise said frame, is disposed a fan shaft 40, extending transversely across the machine, and having a fan 41 keyed therewith. A housing 42 for this fan 41 is connected at 43 upon the beams of the frame 35, and the fan housing 42 opens rearwardly in a spout 44, wherein the forward end of the separating shoe 45 is adapted to rest, in a manner well known to the art. The fan housing 42, at the side walls thereof, rotatably supports an augur shaft 47, having an augur 48 keyed thereon, and operating within a suitable trough 49 provided in the lower part of the fan housing, to the rear of the fan shaft.

As shown more particularly in Figures 2 and 3 of the drawings, the separator unit G includes a shoe 45, movably supported at opposite sides by links 51 upon the side beams comprising the frame 35, so that the shoe 45 may be moved forwardly and rearwardly in a reciprocatory manner, without tilting it from a position in which it moves in a plane parallel to the plane of the frame 35. As before mentioned, the opening end of the shoe 45 rests in the rear facing wind exit 44 of the fan housing. In the top of the shoe 45 are disposed screens 54 of conventional formation, which are adapted to separate the chaff and foreign materials from the grain; the latter sifting through the sieve 54 onto the inclined bottom of the shoe 45, from whence it is shaken, and rolled into the augur trough 49 and conveyed by the augur 48 to the elevator H.

As to the means which maintains the separator unit G level under various conditions of travel, one of the beams 35ª of the frame 35 is provided with a substantially half-circular or segmental support 57, connected at its ends upon the ends of the beam 35ª, and depending therefrom. It supports a weight 60, shown in Figure 2 of the drawings, and elsewhere, which may be clamped by a set screw 61 in any position along the arc of the supporting segment 57. Incident to this weight, the separator unit G, including the fan 41; its housing; the augur 48; and the shoe 45 together with its screen 54 are maintained on an even keel; the unit G together with the weight 60 acting as a pendulum operating on the bearings 24 of the shaft 20, as an axis.

Means is provided to shake the screens 54, preferably comprising a connecting rod 65, pivoted at 66 to the shoe 45, and having an eccentric connection at 68 onto the fan shaft 40. Upon rotation of the fan shaft, thru the eccentric 68, the rod 65 will be reciprocated and will cause reciprocation of the shoe 45 together with the screens 54, for causing a sifting action of the grain onto the floor of the shoe and thence into the augur trough 49, as is perfectly apparent.

The elevator H is of the endless belt type, having flights or hoppers thereon for lifting the grain from the conveyor 48 to the recleaner mechanism K. The elevator H is fixed at its ends with respect to the machine housing, and it is provided with an enclosing housing 70, of approved construction. It is more particularly illustrated in Figure 6 of the drawings, which shows that a trough 71 is provided for the lower end of the elevator H, over which the exit end of the augur trough 49 operates. As shown in Figure 7, the augur trough 49 for the augur 48 is provided with an exit spout 50 which opens into the arcuated trough 71; the latter being secured to the machine housing in any approved relation, and being in length equivalent to the length of travel of the exit end of the trough, as the separator unit G swings on its pivot axis, incident to an automatic leveling action. Of course, the elevator H opens into an end of the trough 71, as shown in Figure 6, and conveys the grain from the trough 71, where it is dumped by the augur 48, into the upper distributing trough 75 of the recleaner mechanism K, wherein an augur 76 operates to distribute the grain, to be given another cleaning action in the recleaner K.

The arrangement for the recleaning mechanism or unit K is quite similar to that above described. The augur housing 75, to which the grain is carried by the elevator H is supported in the side walls 10 and 11 of the housing of the machine, as more particularly illustrated in Figure 8, and bears in the upper beams 16 and 17 forming the frame structure of the thresher housing. At the inside of each of the walls 10 and 11, concentric with the augur housing 75, is a bearing 80, similar to the bearing 24 above described, and providing annular grooves 81, which oscillatively receive the segmental portions 82 of the inverted V-shaped supports 83, which support side beams 84 of the swinging frame of the recleaner unit K. The beams 84 are arranged similar to the beams 35 above described for the separator unit G, and at least one of them is provided with a weight 86, which may be adjustably positioned by a set screw 87 upon an arcuated supporting rod or member 88, connected at its ends to the ends of one of said beams 84. By adjusting the weight 86 upon the rod 88 the frame of the recleaner and its supported parts may be maintained upon an even keel, at a pitch desired.

The frame beams 84 support a fan housing 90, rigidly, wherein a fan 91 is rotatably supported upon a shaft 92; the latter bearing on the beams 84, at its ends. The fan housing 90 opens forwardly and in its exit end supports the rear open end of the recleaner shoe 96. This shoe 96 is suitably supported by links 97, shown in Figure 4 of the drawings, upon the beams 84. The shoe 96 has screens 98 in the upper portion thereof, onto which the grain and other foreign materials may fall and be distributed as the augur 76 carries the grain along the trough 75 and it falls from the latter through suitable openings provided therealong, in a manner understood in this art.

The shoe 96, and its screen 98 may be vibrated or reciprocated, or otherwise shaken by a connecting rod 100, which is pivoted at 101 on the shoe and has an eccentric connection 102 on the fan shaft 92.

The fan housing 90 of the recleaner unit is provided with a lower trough 105, shown more particularly in Figure 1 of the drawings, and also Figure 5, wherein a sacking augur 106 is rotatably positioned upon a shaft 107; the latter bearing in the side walls of the fan housing 90. The augur 106 conveys the separated grain to the elevator L, shown at 110 in Figure 5 of the drawings, from whence the grain is carried by the elevator L to sacks or sacking mechanism.

Referring to the drive of the shafts of the separator unit G, externally of the housing B, at a side thereof, the main shaft 20; fan shaft 40; and conveying augur shaft 47 are provided with suitable sprockets 111, 112 and 113; shown more particularly in Figure 2 of the drawings, over which is trained a sprocket chain 114, for synchronous drive of said shafts and their respective supporting parts.

In like manner the augur shaft 76; the sacking augur on the shaft 107, and the fan shaft 92 of the recleaning mechanism K are provided with sprocket wheels 120, 121 and 122 respectively, having a chain 123 trained thereover for synchronous drive, see Figure 4.

It is quite apparent from the foregoing that both the separator unit G and the recleaner K will be actuated in a pendulum-like manner to maintain their respective mechanisms upon an even keel. This is very essential, so far as a grain cleaning operation is concerned, as will be well understood by those skilled in the art to which this invention relates. Independent of the topography of the country, it may sometimes be necessary to maintain the units G and K on a different level than at another time, for instance, where different types of grain or different weights of wheat or grain are being threshed. This may be readily taken care of adjusting the weights 60 or 86, as the case may be, along the respective arcuated supporting rods 57 and 88, to the position desired.

Various changes in the shape, size, and arrangement of parts may be made to the form of invention herein shown and described, without departing from the spirit of the invention or the scope of the claims.

I claim:

1. In a traveling threshing machine of the class described the combination of a housing, a self leveling grain separator unit pivoted in the housing comprising a conveyor, screens, and a blower operating between the screens and conveyor, a self leveling recleaning unit pivoted for gravity action in the threshing machine comprising a screen, a distributor, and a blower operating between the screen and conveyor, and means for conveying the grain from the conveyor of the separator unit to the screen of the recleaning unit at all times independent of the changing angular relation of the self leveling unit with respect to the rest of the machine.

2. In a cleaner leveling device for threshers the combination of a chassis, a frame, means pivoting the frame for swinging on a predetermined axis on the chassis, grain cleaning means carried by the frame, an adjustable weight carried by the frame for bringing the frame and its grain cleaning means to a predetermined keel, said means comprising an arcuated rod carried below the frame having a sliding weight thereon, and means to clamp the sliding weight at a predetermined location on the rod.

3. In a grain cleaner the combination of a chassis, a frame pivoted on the chassis, weight means for maintaining the frame substantially level, a cleaner shoe carried by said frame, a fan rotatable on said frame, a distributing conveyor operating axially of the pivot axis of the frame, a screen on the cleaner shoe for receiving the grain from said distributor, means for agitating the cleaner shoe, and an augur conveyor rotatably carried by said frame for transferring grain from the cleaner shoe to a desired location.

JOSEPH F. NAFFZIGER.